United States Patent
Bogle

(10) Patent No.: US 10,647,512 B2
(45) Date of Patent: May 12, 2020

(54) DRIVE AND SIDEGUARD BELT INSERT FOR A MODULAR PLASTIC CONVEYOR BELT

(71) Applicant: Laitram, L.L.C., Harahan, LA (US)

(72) Inventor: David W. Bogle, Round Rock, TX (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/084,436

(22) PCT Filed: Apr. 5, 2017

(86) PCT No.: PCT/US2017/026077
§ 371 (c)(1),
(2) Date: Sep. 12, 2018

(87) PCT Pub. No.: WO2017/176846
PCT Pub. Date: Oct. 12, 2017

(65) Prior Publication Data
US 2019/0077606 A1    Mar. 14, 2019

Related U.S. Application Data

(60) Provisional application No. 62/319,519, filed on Apr. 7, 2016.

(51) Int. Cl.
*B65G 17/08* (2006.01)
*B65G 17/40* (2006.01)
*B65G 17/46* (2006.01)

(52) U.S. Cl.
CPC ............ *B65G 17/08* (2013.01); *B65G 17/40* (2013.01); *B65G 17/46* (2013.01); *B65G 2207/12* (2013.01); *B65G 2207/30* (2013.01)

(58) Field of Classification Search
None
See application file for complete search history.

(56) References Cited

U.S. PATENT DOCUMENTS

| 4,821,872 A | 4/1989 | Lapeyre |
| 6,216,854 B1 | 4/2001 | Damkjaer et al. |
| 7,364,037 B2 | 4/2008 | Elsner |
| 7,802,676 B2 * | 9/2010 | Guldenfels ............ B65G 17/40 198/688.1 |

(Continued)

FOREIGN PATENT DOCUMENTS

WO    2015044712 A1    4/2015

OTHER PUBLICATIONS

Extended European Search Report of European Patent Application No. 17779718.0, dated Oct. 2, 2019, European Patent Office, Munich, Germany.

*Primary Examiner* — Kavel Singh
(74) *Attorney, Agent, or Firm* — Catherine M. Bishop

(57) ABSTRACT

A modular conveyor belt constructed of a series of hingedly interconnected belt modules, one or more modules comprises a base conveyor belt module and an insert for integrating a side wall and drive structure. The insert is received in a socket of an associated module. The insert comprising a plug portion received in the socket, a planar portion extending up from the plug portion to form a side guard above the top surface and drive structure for engaging a drive.

19 Claims, 2 Drawing Sheets

(56) References Cited

U.S. PATENT DOCUMENTS

| | | |
|---|---|---|
| 8,851,271 B2 * | 10/2014 | Buter .................. B65G 17/086 198/778 |
| 2003/0000810 A1 | 1/2003 | Hansen et al. |
| 2003/0015406 A1 | 1/2003 | Guldenfels et al. |
| 2005/0092585 A1 | 5/2005 | Nelson et al. |
| 2008/0135383 A1 | 6/2008 | Elsner |
| 2010/0282577 A1 | 11/2010 | Rettore et al. |
| 2011/0297513 A1 | 12/2011 | Lago |
| 2014/0021020 A1 | 1/2014 | Bogle et al. |
| 2015/0047952 A1 | 2/2015 | Talsma et al. |

* cited by examiner

DRIVE AND SIDEGUARD BELT INSERT FOR A MODULAR PLASTIC CONVEYOR BELT

RELATED APPLICATIONS

The present application claims priority to U.S. Provisional Patent Application No. 62/319,519, filed Apr. 7, 2016 and entitled "Drive and Sideguard Belt Insert for a Modular Plastic Conveyor Belt", the contents of which are herein incorporated by reference.

BACKGROUND OF THE INVENTION

The invention relates generally to power-driven conveyors and, more particularly, to modular plastic conveyor belts.

Conveyor belts are typically used for conveying bulk material, such as foodstuffs or other materials, that must be transported from a first location to a second location. Typical conveyor belts have the advantage that relatively little energy is required for transporting the bulk material across horizontal surfaces.

For versatility, replaceability, or manufacturability, conveyor belts often include accessories that can be attached to and detached from the belts. Examples include sideguards, hold down tabs, flights, and roller assemblies. The accessories in modular conveyor belts are often retained by hinge rods used to interconnect the belt modules together at hinge joints. In that case installation or removal of the accessory requires partial disassembly of the belt.

Sideguards are commonly used with belt conveyors to prevent conveyed materials such as aggregates, vegetables, and fruits from falling off the sides of the belt. Typically, a sideguard is positioned near both sides of each belt row. In modular plastic conveyor belts, sideguards are usually supplied as attachments to belts. The sideguards snap into belt structure or are connected to the hinge rods joining consecutive rows of belt modules together.

SUMMARY OF THE INVENTION

A side drive conveyor belt transports articles along a path. One version of a side drive conveyor belt embodying features of the invention employs an insert coupled to a base conveyor belt module to integrate a side guard and drive structure to the conveyor belt module.

According to one aspect, an insert for a conveyor belt comprises a base portion, a drive tooth extending from a side surface of the base portion, and a protrusion extending vertically upwards from a top surface of the base portion.

According to another aspect, a conveyor belt module comprises a base module comprising a module body and a plurality of hinge elements extending from first and the second ends of the module body, the base module having a top surface and a bottom surface, a socket formed in the base module, the socket opening to the top surface and the bottom surface and an insert inserted in the socket. The insert has a plug portion received in the socket, a planar portion extending up from the plug portion to form a side guard above the top surface and drive structure for engaging a drive.

According to another aspect, conveyor belt module comprising a base module, a socket and an insert. The base module comprises a module body and a plurality of hinge elements extending from first and the second ends of the module body, the base module having a top surface and a bottom surface. The socket is formed in the base module and opens to the top surface and the bottom surface. The insert comprises a base portion, a plug portion extending upwards from the base portion and received in the socket, and a drive element extending from a side of the base portion for engaging a conveyor drive.

BRIEF DESCRIPTION OF THE DRAWINGS

These features and aspects of the invention, as well as its advantages, are better understood by referring to the following description, appended claims, and accompanying drawings, in which:

DETAILED DESCRIPTION OF THE INVENTION

A side-driven conveyor belt (also referred to as an edge-driven conveyor belt) is formed of a plurality of connected modules. An insert in a module forms both a side guard and drive structure for the conveyor belt. The invention will be described below relative to certain illustrative embodiments, though one skilled in the art will recognize that the invention is not limited to the illustrative embodiments.

Figure 1:
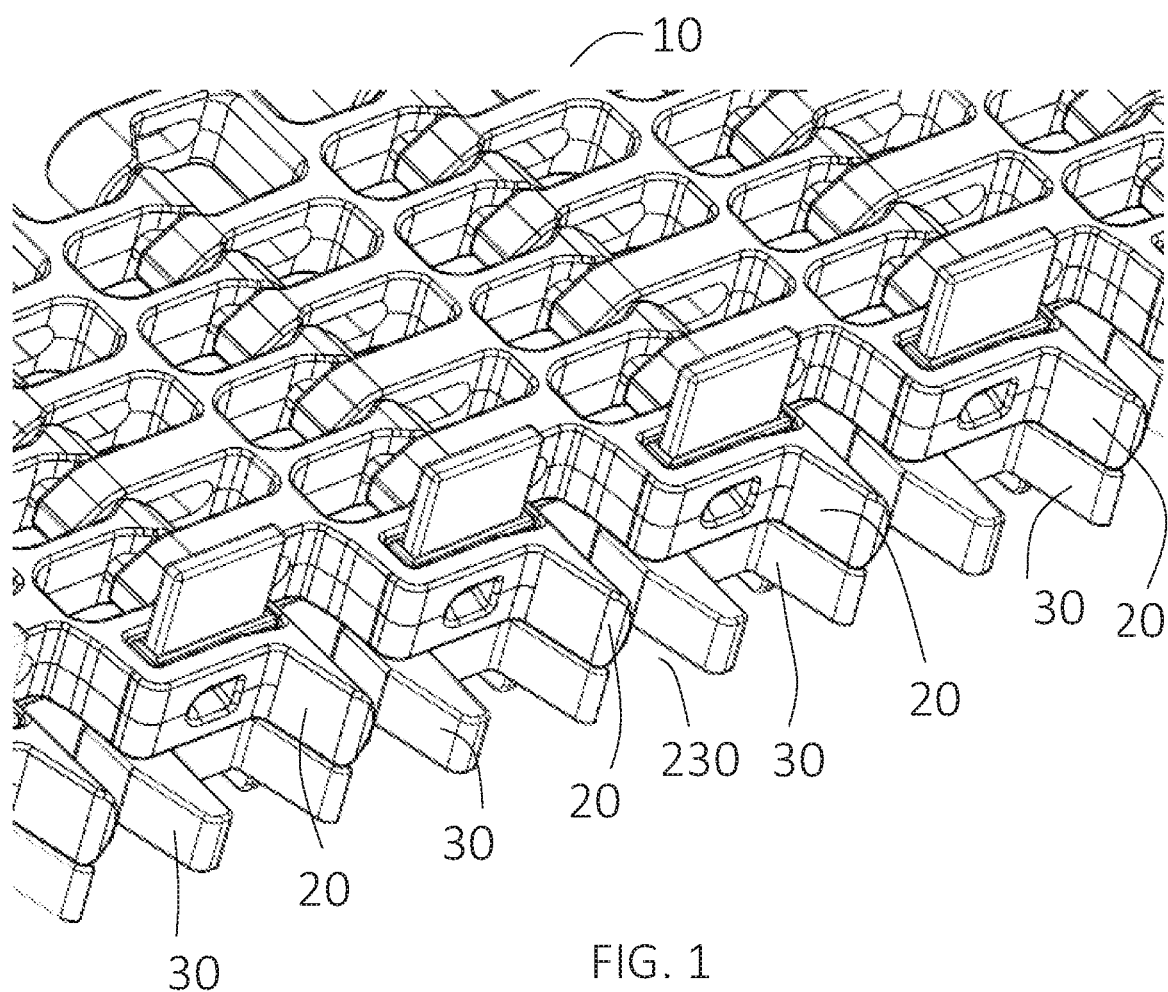
FIG. 1 is a partial isometric view of a side edge of a conveyor belt comprising a plurality of hingedly connected modules having inserts inserted therein according to an embodiment of the invention.

A portion of a side-driven conveyor belt 10 formed using connected modules 20, each with an insert 30 forming both a side guard and drive structure, is shown in FIG. 1. The invention is not limited to a dedicated insert 30 per module, and the inserts 30 may be added to select modules only. The module and-or insert are preferably molded out of a thermoplastic material, such as polypropylene, polyethylene, acetal, or a composite resin that may include fibers or other additives.

Figure 2:
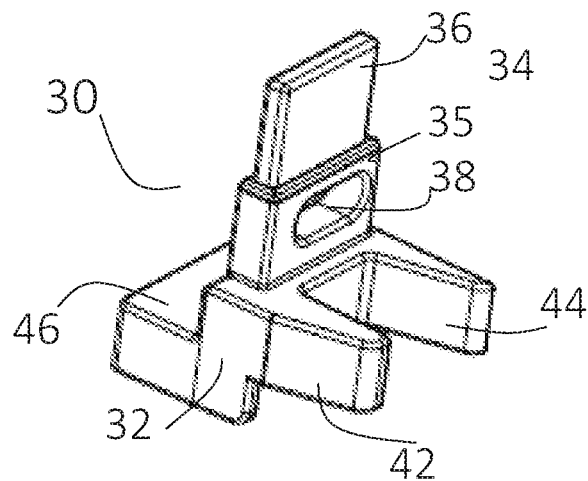
FIG. 2 is an isometric view of a side edge of a base conveyor belt module suitable for receiving an insert according to an embodiment of the invention.

As shown in FIG. 2, each base module 20 (i.e., a module without an insert) includes a module body 12 and hinge elements 22, 23 for linking a plurality of modules together to form a conveyor belt. The base module 20 extends in thickness from a top side 14 forming a conveying surface to an opposite bottom side 15. The module body 12 extends longitudinally from a first end 16 to a second end 17. The module body and base module extend transversely in a lateral direction from a first side (not shown) to a second side 18. First and second sets of hinge elements 22, 23 are spaced apart along the first and second ends of the module body. The top side 14 and bottom side 15 of the module body 12 also form the top and bottom sides of the hinge elements 22, 23. Holes 24 through the hinge elements admit a hinge rod for interconnecting modules together into a conveyor belt. The illustrative module body 12 basically comprises a beam extending across the width of the module, though the module body could have any suitable size, shape and configuration.

A socket 19 in the base module opens onto the top and bottom sides 14, 15 of the module for receiving the insert 30. In the illustrative embodiment, the socket 19 is formed in an edge hinge element 220 near the second side 18, which is wider than the other hinge elements 22 on the first end. A hinge element on the first side of the module may also include a socket for receiving an insert 30. The illustrative edge hinge element 220 also includes a protrusion 222 extending from the second side of the module forming a drive tooth. The illustrative protrusion 222 includes a flat front surface 225 parallel to the module body and an oblique rear surface 224 so that the protrusion 222 tapers to a tapered end 227.

Figure 3:
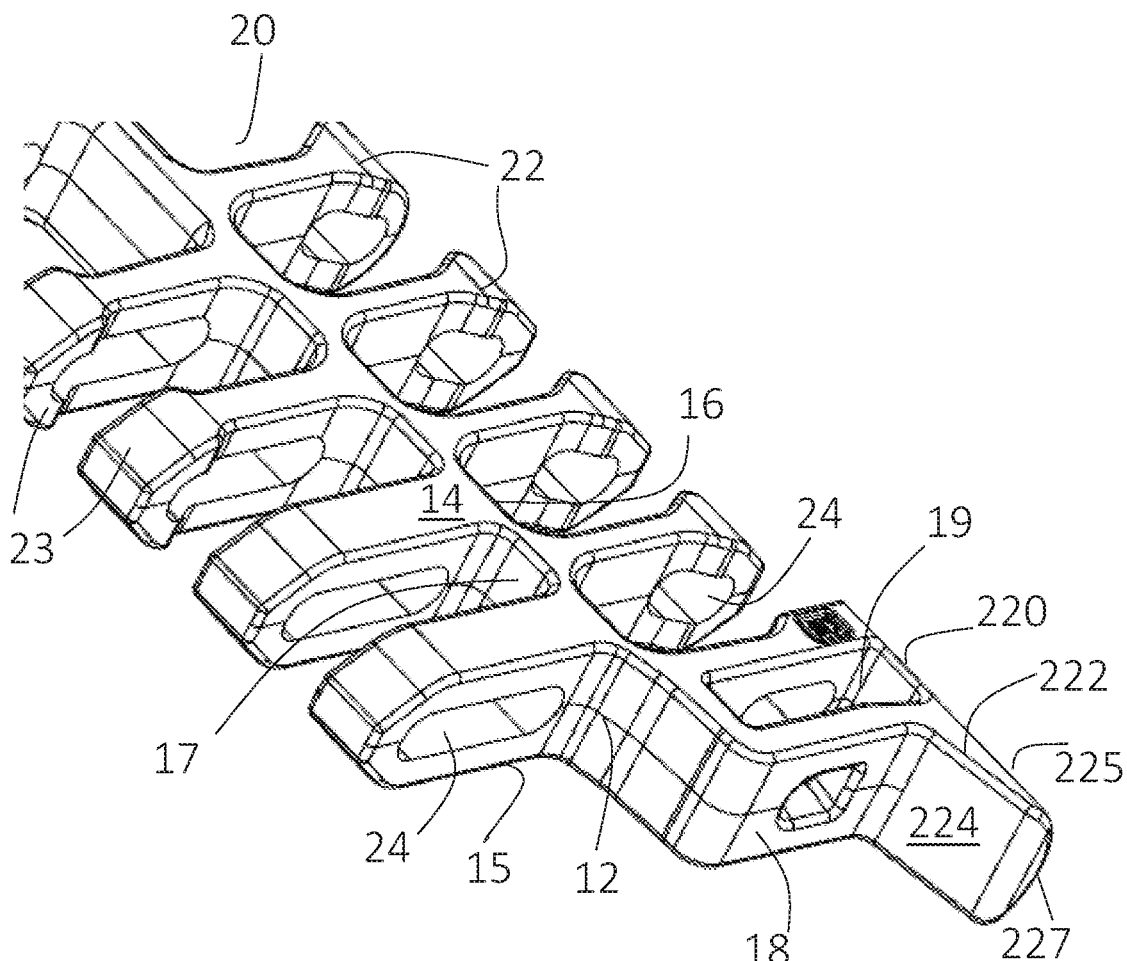
FIG. 3 is an isometric view of an insert for a conveyor belt modules including drive structure and a side guard.

The insert 30 is sized to mate with and plug into the socket 19 in the base module. As shown in FIG. 3, the illustrative insert 30 comprises a base portion 32 that is substantially cuboidal in shape, though the invention is not so limited. The base portion has a top face, a bottom face, an inside face, an outside face, a front face and a rear face. Drive structure, shown as drive teeth 42, 44, extends laterally outward of the outside face of the base portion 32. A shelf 46 extends laterally inwards from the inside face. The illustrative shelf 46 has a bottom face that is flush with the bottom face of the base portion 32 and a top face that is stepped down from the top face of the base portion 32. A tiered protrusion 34 extends up from the top face of the base portion and includes a first tier 35 forming a plug for the socket 19 and a second tier 36 forming a side wall of a side guard.

The illustrative plug portion 35 is also cuboidal and smaller laterally and longitudinally than the base portion 32, though the invention is not so limited. The plug portion 35 may have any suitable size, shape and position suitable for being received by the socket 19. In the illustrative embodiment, the plug portion 35 is press-fit into the socket, which retains the insert 30 by friction, though any suitable means for retaining the insert may be used. The plug portion 35 includes a hinge rod opening 38 that aligns with the hinge openings when the plug portion 35 is inserted in the socket. The insert is mostly held in place through friction, though the hinge rod extending through the plug and hinge openings 24 may also assist in securing the insert to the base module.

The side wall portion 36 may have any suitable shape, size and position suitable for forming a side wall for the module to contain articles on the conveyor belt and prevent conveyed articles from moving laterally past the conveying surface 14. The illustrative side wall portion 36 is solid, planar and extends vertically up from the plug portion 35. The illustrative side wall portion 36 is smaller in latitude and longitudinal than the plug portion, but the invention is not so limited. For example, the side wall portion 36 may be corrugated or have openings to allow air flow. The openings may be shaped to promote cross direction air flow.

The drive teeth 42, 44 on the insert 30 may have any suitable size, shape, orientation, location and configuration. Each illustrative drive tooth 42, 44 has a flat front surface parallel to the flat front face 225 of the protrusion 222 and an oblique rear face that intersects the flat front face to form a tapering tip. However, the invention is not limited to the illustrative drive structure.

Referring back to FIG. 1, when the insert 30 is inserted in the socket 19 to integrate the drive structure and side wall to the conveyor belt module 20, the front drive tooth 44 of the insert 30 is disposed below and aligned with the protrusion 222 to form a large drive surface. Preferably, the bottom surface of the base drive tooth 222 rests on the upper surface of the forward drive tooth 44. The side wall portion 36 extends upward from the base module top surface 14 at a lateral position spaced inward from the teeth 42, 44, 222. The bottom of the base module 15 rests on the top of the teeth 42, 44 and the top face of the base portion 32 of the insert, with the shelf 46 spaced from the bottom surface 15. The gap between the shelf 46 and bottom surface 15 allows the belt to go over a wearstrip that creates a hold down to keep the belt from popping up with belt tension.

The base portion 32 of the insert 30 has a length that is approximately equal to the length of the edge hinge element 220, so that the front of the insert 30 aligns with the front of the module and the rear of the base portion aligns with the rear of the edge hinge element 220, creating a gap 230 between modules at the side edge of the assembled conveyor belt in which no side wall or structure is present. While the illustrative embodiment shows a gap 230, the invention is not so limited. For example, the side wall portions can overlap to prevent a gap, or the module body can be shaped to prevent gaps.

The insert 30 facilitates integration of multiple drive teeth and a side wall to a module. The base module alone, without the insert 30, only has room for a single drive tooth (protrusion 222), due to rod insertion features and parting line constraints. The insert 30 allow integration of two drive teeth. In addition to increasing the number of drive teeth on the edge of the conveyor belt to prevent skipping, the insert halves the drive pitch, providing advantages.

Although the invention has been described in detail with reference to a few exemplary versions, other versions are possible. The scope of the claims is not meant to be limited to the versions described in detail.

What is claimed is:

1. A conveyor belt module, comprising:
   a base module comprising a module body and a plurality of hinge elements having hinge openings, the hinge elements extending from first and second ends of the module body, the base module having a top surface and a bottom surface;
   a socket formed in the base module, the socket opening to the top surface and the bottom surface; and
   an insert inserted in the socket, the insert having a plug portion received in the socket, the plug portion having a hinge rod opening that aligns with hinge openings in hinge elements extending from the first end of the base module, a planar portion extending up from the plug portion to form a side guard above the top surface and drive structure for engaging a drive.

2. The conveyor belt module of claim 1, wherein the socket is formed in an edge hinge element on the first end of the module body.

3. The conveyor belt module of claim 2, further comprising a base drive tooth extending laterally from the edge hinge element.

4. The conveyor belt module of claim 3, wherein the insert comprises a forward drive tooth and a rear drive tooth, and the forward drive tooth lies below and aligns with the base drive tooth to form a large drive surface.

5. The conveyor belt module of claim 2, wherein the edge hinge element is wider than other hinge elements on the first end of the module body.

6. The conveyor belt module of claim 3, wherein the base drive tooth comprises a flat front surface parallel to the module body and an oblique rear surface so that the base drive tooth tapers to a tapered end.

7. The conveyor belt module of claim 1, wherein the insert includes a base portion from which the plug portion extends, and wherein the drive structure comprises at least one drive tooth extending from a side of the base portion.

8. The conveyor belt module of claim 7, wherein the insert further comprises a shelf extending from a side surface of the base portion opposite the drive tooth, the shelf having an upper surface stepped down from an upper surface of the base portion and a bottom surface flush with a bottom surface of the base portion.

9. The conveyor belt module of claim 7, wherein the base portion has a top face, a bottom face, an inside face, an outside face, a front face and a rear face, and the insert further comprise a forward drive tooth and a rear drive tooth extending laterally outward from the outside face.

10. The conveyor belt module of claim 9, wherein the plug portion is smaller laterally and longitudinally than the base portion and the planar portion is smaller laterally and longitudinally than the plug portion.

11. The conveyor belt module of claim 10, wherein the planar portion is spaced laterally inward from the forward drive tooth and rear drive tooth.

12. The conveyor belt module of claim 11, wherein the bottom surface of the base module rests on the top of the forward drive tooth, the rear drive tooth and the top face of the base portion.

13. A conveyor belt module, comprising:
a base module comprising a module body and a plurality of hinge elements having hinge openings, the hinge elements extending from first and the second ends of the module body, the base module having a top surface and a bottom surface;
a socket formed in an edge hinge element on the first end of the base module, the socket opening to the top surface and the bottom surface; and
an insert coupled to the base module, the insert comprising a base portion, a plug portion extending upwards from the base portion and received in the socket, and a drive element extending from a side of the base portion for engaging a conveyor drive, wherein the base portion of the insert has a length approximately equal to the length of the edge hinge element, so that the front of the insert aligns with the front of the module and the rear of the insert base portion aligns with the rear of the edge hinge element.

14. The conveyor belt module of claim 13, wherein the drive element comprises a forward drive tooth and a rear drive tooth spaced from the forward drive tooth.

15. The conveyor belt module of claim 13, wherein the insert further comprises a planar portion extending vertically from the plug portion above the top surface forming a side guard for the conveyor belt module.

16. The conveyor belt module of claim 13, wherein the plug portion of the insert includes a hinge rod opening that aligns with the hinge openings in the base module.

17. The conveyor belt module of claim 13, wherein the insert further comprises a shelf extending from a side surface of the base portion opposite the drive element, the shelf having an upper surface stepped down from an upper surface of the base portion and a bottom surface flush with a bottom surface of the base portion.

18. A conveyor belt module, comprising:
a base module comprising a module body and a plurality of hinge elements having hinge openings, the hinge elements extending from first and second ends of the module body, the base module having a top surface and a bottom surface;
a socket formed in the base module, the socket opening to the top surface and the bottom surface; and
an insert inserted in the socket, the insert having a base portion, a plug portion extending from the base portion and received in the socket, a planar portion extending up from the plug portion to form a side guard above the top surface, at least one drive tooth extending from a side of the base portion for engaging a drive and a shelf extending from a side of the base portion opposite the drive tooth, the shelf having an upper surface stepped down from an upper surface of the base portion and a bottom surface flush with a bottom surface of the base portion.

19. A conveyor belt module, comprising:
a base module comprising a module body and a plurality of hinge elements having hinge openings, the hinge elements extending from first and the second ends of the module body, the base module having a top surface and a bottom surface;
a socket formed in the base module opening to the top surface and the bottom surface; and
an insert coupled to the base module, the insert comprising a base portion with a top face, bottom face, inside face, outside face, front face and rear face, a plug portion extending upwards from the top face of the base portion and received in the socket and a drive element, the drive element comprising a forward drive tooth and a rear drive tooth extending laterally outward from the outside face of the base portion.

* * * * *